US011290854B2

(12) United States Patent
Natarajan et al.

(10) Patent No.: US 11,290,854 B2
(45) Date of Patent: Mar. 29, 2022

(54) METHOD AND APPARATUS FOR PROVIDING A MULTIMEDIA BROADCAST MULTICAST SERVICE

(71) Applicant: Samsung Electronics Co., Ltd., Gyeonggi-do (KR)

(72) Inventors: Sridharan Natarajan, Bangalore (IN); Sudheer Kumar Hundi, Bangalore (IN); Chandan Swarup Patra, Bangalore (IN)

(73) Assignee: Samsung Electronics Co., Ltd.

(*) Notice: Subject to any disclaimer, the term of this patent is extended or adjusted under 35 U.S.C. 154(b) by 211 days.

(21) Appl. No.: 15/976,263

(22) Filed: May 10, 2018

(65) Prior Publication Data
US 2018/0332444 A1 Nov. 15, 2018

(30) Foreign Application Priority Data

May 11, 2017 (IN) .................. 201741016541 PS
Feb. 15, 2018 (IN) .................. 201741016541 CS

(51) Int. Cl.
*H04W 4/08* (2009.01)
*H04W 24/08* (2009.01)
(Continued)

(52) U.S. Cl.
CPC ............ *H04W 4/08* (2013.01); *H04W 24/02* (2013.01); *H04W 24/08* (2013.01); *H04W 72/005* (2013.01); *H04W 72/085* (2013.01)

(58) Field of Classification Search
CPC ....... H04W 4/08; H04W 24/02; H04W 24/08; H04W 72/005; H04W 72/085
See application file for complete search history.

(56) References Cited

U.S. PATENT DOCUMENTS

2013/0128756 A1   5/2013 Zhang et al.
2013/0268577 A1  10/2013 Oyman
(Continued)

FOREIGN PATENT DOCUMENTS

CN   102761829   10/2012
CN   103546477    1/2014
(Continued)

OTHER PUBLICATIONS

International Search Report dated Aug. 24, 2018 issued in counterpart application No. PCT/KR2018/005381, 18 pages.
(Continued)

*Primary Examiner* — Luat Phung
(74) *Attorney, Agent, or Firm* — The Farrell Law Firm, P.C.

(57) ABSTRACT

A method for providing a multimedia broadcast multicast service (MBMS) in a wireless communication system and an apparatus are provided, the method comprises obtaining information on a quality of experience (QoE) evaluated for each evolved MBMS (eMBMS) from among a plurality of eMBMSs in a service region, the QoE being evaluated based on a report from each user equipment (UE) receiving data of the each eMBMS, and determining, based on the information on the evaluated QoE, whether to switch a transmission mode for transmission of at least one of eMBMS content associated with the plurality of eMBMSs.

18 Claims, 8 Drawing Sheets

(51) Int. Cl.
      *H04W 24/02*    (2009.01)
      *H04W 72/08*    (2009.01)
      *H04W 72/00*    (2009.01)

(56) References Cited

U.S. PATENT DOCUMENTS

| | | |
|---|---|---|
| 2014/0033242 A1 | 1/2014 | Rao et al. |
| 2014/0092731 A1 | 4/2014 | Gupta |
| 2014/0341104 A1 | 11/2014 | Zhao et al. |
| 2015/0109987 A1* | 4/2015 | Wang .................... H04W 12/08 370/312 |
| 2016/0191258 A1* | 6/2016 | Oyman ................ H04L 12/189 370/312 |
| 2016/0262033 A1* | 9/2016 | Long ................... H04L 65/4076 |
| 2017/0374581 A1* | 12/2017 | Dao ..................... H04W 76/40 |
| 2018/0199115 A1* | 7/2018 | Prasad .................. H04N 21/64 |
| 2020/0120452 A1* | 4/2020 | Lohmar ................. H04L 65/80 |

FOREIGN PATENT DOCUMENTS

| | | |
|---|---|---|
| CN | 104604263 | 5/2015 |
| CN | 105338549 | 2/2016 |
| KR | 1020170002670 | 1/2017 |
| WO | WO 2015/192311 | 12/2015 |

OTHER PUBLICATIONS

Chinese Office Action dated Mar. 26, 2021 issued in counterpart application No. 201880031066.3, 22 pages.

\* cited by examiner

METHOD AND APPARATUS FOR PROVIDING A MULTIMEDIA BROADCAST MULTICAST SERVICE

CROSS-REFERENCE TO RELATED APPLICATION(S)

This application is based on and claims priority under 35 U.S.C. § 119(a) to Indian Patent Application Serial No. 201741016541 (PS), which was filed in the Indian Patent Office on May 11, 2017, and to Indian Patent Application Serial No. 201741016541 (CS), which was filed in the Indian Patent Office on Feb. 15, 2018, the entire disclosure of each of which is incorporated by reference herein.

BACKGROUND

1. Field

The present disclosure relates generally to wireless communications systems in long term evolution (LTE) networks, and more particularly, to a method and apparatus for multimedia broadcast multicast service (MBMS) on demand (MooD) service.

2. Description of the Related Art

LTE MooD is introduced in third generation partnership project (3GPP) and allows service providers to dynamically change from broadcast mode to unicast mode and vice versa based on the demand for the particular broadcast or unicast service. This includes dynamically switching a solution between unicast and broadcast based on content usage and user demand for a flexible allocation of radio resources. FIG. 1 is a system diagram illustrating an exemplary MooD deployment scenario for providing a particular service to a user device, according to the conventional art. In such a system, a user demand measurement for a particular service is performed based on consumption reporting received from a MooD capable user equipment (UE). The consumption reporting of the MooD capable UE is received by a consumption reporting server (CRS) 101 as shown in FIG. 1.

The consumption reporting is then processed at an e-scheduler 103. Based on the consumption report, the e-scheduler 103 instructs a broadcast multicast service center (BM-SC) 105 to host the particular service to other UEs whether in a broadcast mode or a unicast mode. The particular service to be broadcast or unicast is decided based on a threshold limit set at the BM-SC 105. For example, if a particular service is consumed by more than 100 users via a MooD capable UE in the unicast mode, then the network identifies that the particular service has gained in popularity and decides to switch the service from the unicast mode to the broadcast mode.

However, the mechanism is present in a very crude format where only the user count is taken into consideration. This will result in a ping-pong effect of unicast mode to broadcast mode and broadcast mode to unicast mode transmission change in the network. Further, the current proposal of MBMS operation on demand could decrease the quality of experience for users and create a dilemma in selecting services.

For example, where a service is delivered to a plurality of UEs present in a region via unicast transmission, it is possible that all the UEs cannot have good coverage conditions and, therefore, some of the UEs may have a bad radio frequency (RF) reception inside a cell due to coverage conditions, cell congestion, etc. As shown in FIG. 2A, a service is unicast to two user groups, namely user group 1 and user group 2, where user group 1 has a good experience, and user group 2 has an average experience. Since the service is transmitted via unicast, a hybrid repeat request (HARQ) mechanism provides required additional gain which improves the user experience in unicast mode. Once the service becomes popular, the MooD switches the transmission of service from unicast mode to broadcast mode. However, when the same service is transmitted in broadcast mode, the experience of user group 2 deteriorates and become worse for a few users due to a lack of a HARQ mechanism in broadcast mode.

Another issue that exists while using a MooD service is a limited availability of network resources. This is because, at any given time, many popular contents could be available for broadcast transmission. However, due to limited broadcast resources, an operator can only broadcast a few selected services. As shown in FIG. 2B, a service 2 is considered popular as per measured user count, and therefore, the MooD switches mode of transmission from unicast mode to broadcast mode to transmit service 2. The selection of service 2 when transmitted in broadcast mode worsens the user experience and eventually the users will stop viewing the content. Thus, instead of broadcasting service 2, service 1 should have been broadcast for providing a better user experience.

There is a need for a method that addresses the issues described above.

SUMMARY

An aspect of the present disclosure provides a method and apparatus in which consumption reporting is able to identify a quality of reception of data received by a UE associated with a user and decide whether the UE should be considered for a unicast to broadcast transmission range for increasing the quality of experience (QoE) for users.

Another aspect of the present disclosure provides a method and apparatus of segregating users into multiple groups which continue to receive unicast transmission from content delivery networks (CDNs) and switched under an evolved MBMS (eMBMS) scheme to broadcast.

Another aspect of the present disclosure provides a method and apparatus for MooD service.

In accordance with an aspect of the present disclosure, a method for providing a multimedia broadcast multicast service (MBMS) in a wireless communication system is provided, the method comprises obtaining information on a quality of experience (QoE) evaluated for each evolved MBMS (eMBMS) from among a plurality of eMBMSs in a service region, the QoE being evaluated based on a report from each user equipment (UE) receiving data of the each eMBMS, and determining, based on the information on the evaluated QoE, whether to switch a transmission mode for transmission of at least one of eMBMS content associated with the plurality of eMBMSs.

In accordance with another aspect of the present disclosure, an apparatus for providing a multimedia broadcast multicast service (MBMS) in a wireless communication system is provided, the apparatus comprises a communication interface configured to communicate with other network entity, and at least one processor coupled with the communication interface and configured to obtain information on a quality of experience (QoE) evaluated for each evolved MBMS (eMBMS) from among a plurality of eMBMSs in a service region, the QoE being evaluated based on a report from each user equipment (UE) receiving data of the each eMBMS, and determine, based on the information on the evaluated QoE, whether to switch a transmission mode for transmission of at least one of eMBMS content associated with the plurality of eMBMSs.

In accordance with another aspect of the present disclosure, a method for receiving a multimedia broadcast multicast service (MBMS) in a wireless communication system is provided, the method comprises receiving eMBMS content in a first transmission mode in a service region, transmitting a quality of experience (QoE) report for the eMBMS content, and continuously receiving the eMBMS content in the first transmission mode or a second transmission mode in the service region in response to the QoE report, wherein the QoE for each eMBMS is evaluated based on the QoE report, and wherein whether to switch the transmission mode for transmission of the eMBMS content is determined based on the evaluated QoE.

In accordance with another aspect of the present disclosure, an apparatus for receiving a multimedia broadcast multicast service (MBMS) in a wireless communication system, the apparatus comprises a transceiver, and a processor coupled with the transceiver and configured to receive eMBMS content in a first transmission mode in a service region, transmit a quality of experience (QoE) report for the eMBMS content, and continuously receive the eMBMS content in the first transmission mode or a second transmission mode in the service region in response to the QoE report, wherein the QoE for each eMBMS is evaluated based on the QoE report, and wherein whether to switch the transmission mode for transmission of the eMBMS content is determined based on the evaluated QoE.

In accordance with another aspect of the present disclosure, a method for multimedia broadcast multicast services (MBMS) on demand (MooD) service is provided. The method includes detecting in a service region a first mode of transmission of at least one of an eMBMS content associated with a plurality of eMBMS services, evaluating a QoE for each eMBMS service from among the plurality of eMBMS services in the service region, and switching the first mode of transmission of at least one of an eMBMS content to a second mode of transmission if the evaluated QoE is above a predetermined threshold.

In accordance with another aspect of the present disclosure, a first mode is a unicast mode and a second mode is a broadcast mode.

In accordance with another aspect of the present disclosure, a method includes retaining a transmission in a first mode for at least one eMBMS content if an evaluated QoE is below a predetermined threshold.

In accordance with another aspect of the present disclosure, in switching a transmission, a method includes calculating a mean opinion score (MOS) of a currently played eMBMS content from QoE for each group of service recipients, applying the estimated MOS to a prediction algorithm to calculate a probability score, and switching the transmission of the currently played eMBMS content to a second mode from a first mode or vice-versa based on the calculated probability score.

In accordance with another aspect of the present disclosure, a method includes detecting in a service region, availability of one eMBMS service for transmission of eMBMS content to a plurality of users in the service region, and segregating the plurality of users into a first group of users and a second group of users based on an MOS for deciding a mode of transmission of eMBMS service from a first mode to a second mode.

In accordance with another aspect of the present disclosure, a first group of users continue to watch an eMBMS service in a first mode if an MOS value of an eMBMS content deteriorates to less or equal than a threshold value (or less than a threshold value).

In accordance with another aspect of the present disclosure, a second group of users receives an eMBMS service in a second mode if an MOS value of an eMBMS content is greater than a threshold value (or greater or equal than a threshold value).

In accordance with another aspect of the present disclosure, a method includes dynamically controlling physical broadcast resource allocation between different services based on a calculated MOS value.

In accordance with another aspect of the present disclosure, a system is provided. The system includes a QoE processing server configured to detect in a service region a first mode of transmission of at least one of an eMBMS content associated with a plurality of eMBMS services, evaluate a QoE for each eMBMS service from among the plurality of eMBMS services in the service region, and switch the first mode of transmission of at least one of the eMBMS content to a second mode of transmission if the evaluated QoE is above a predetermined threshold.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
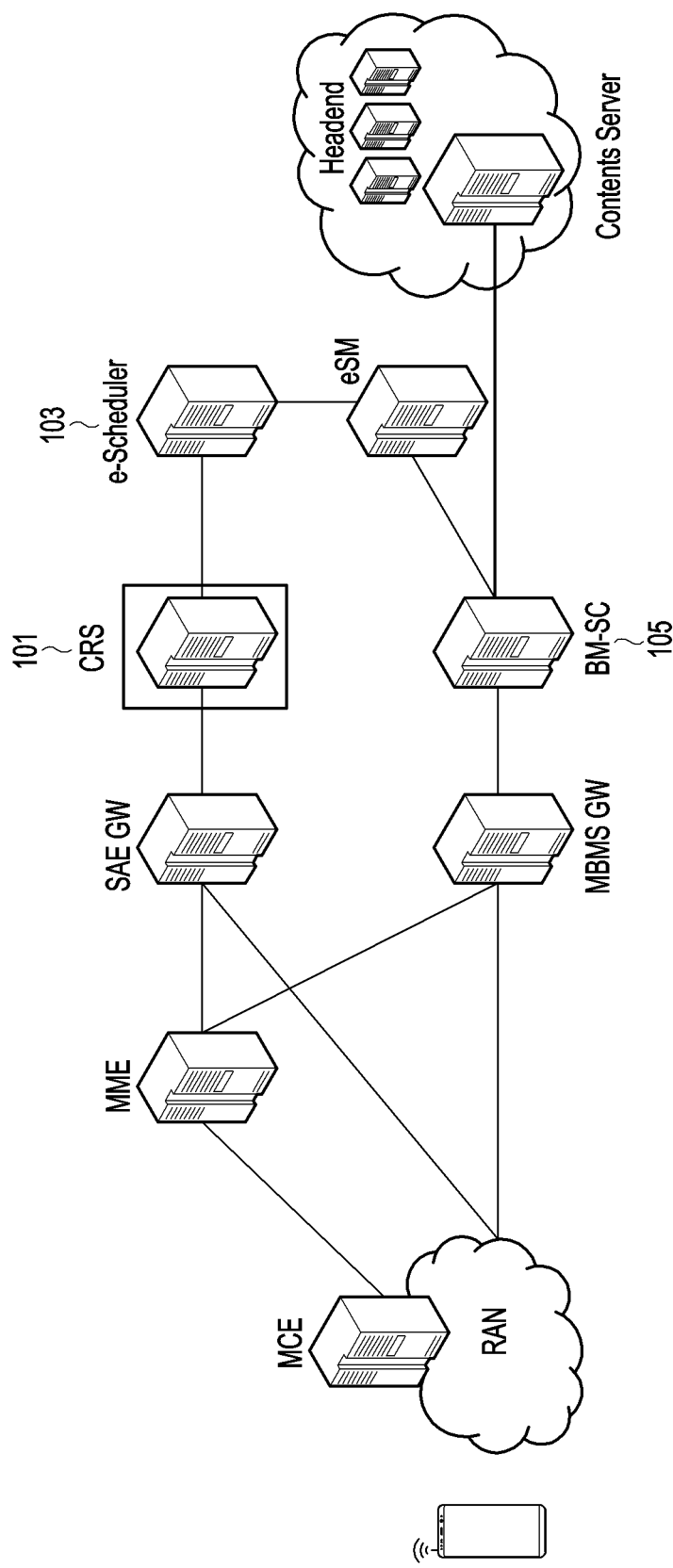
FIG. 1 is a system diagram of an MooD for providing a service to a user device.
Figure 2A:
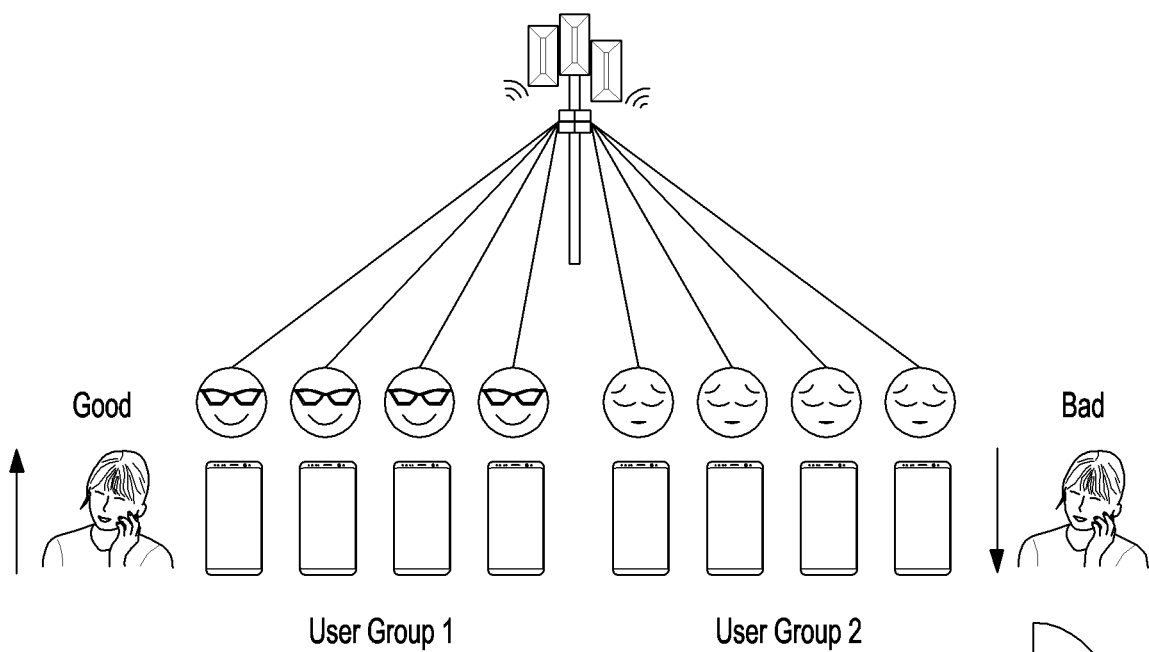
FIGS. 2A and 2B are illustrations of providing a service to a user device.
Figure 2A:
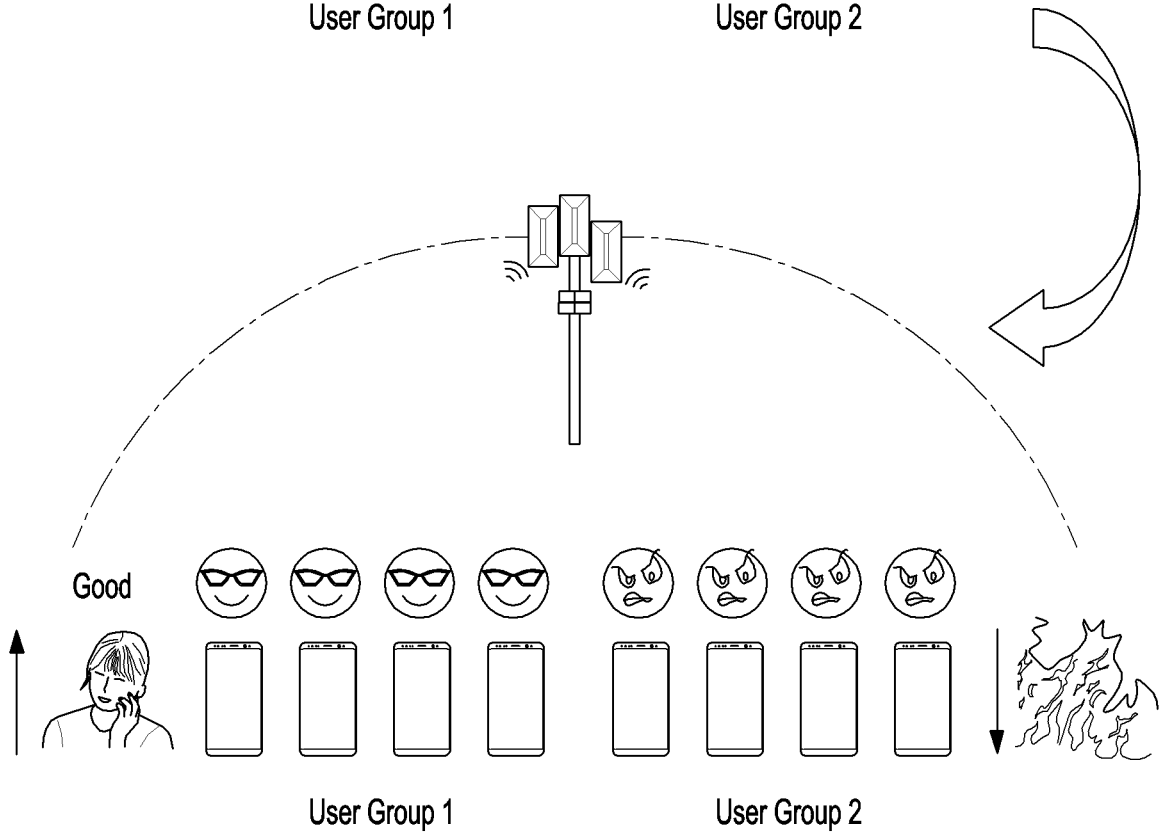
Figure 2B:
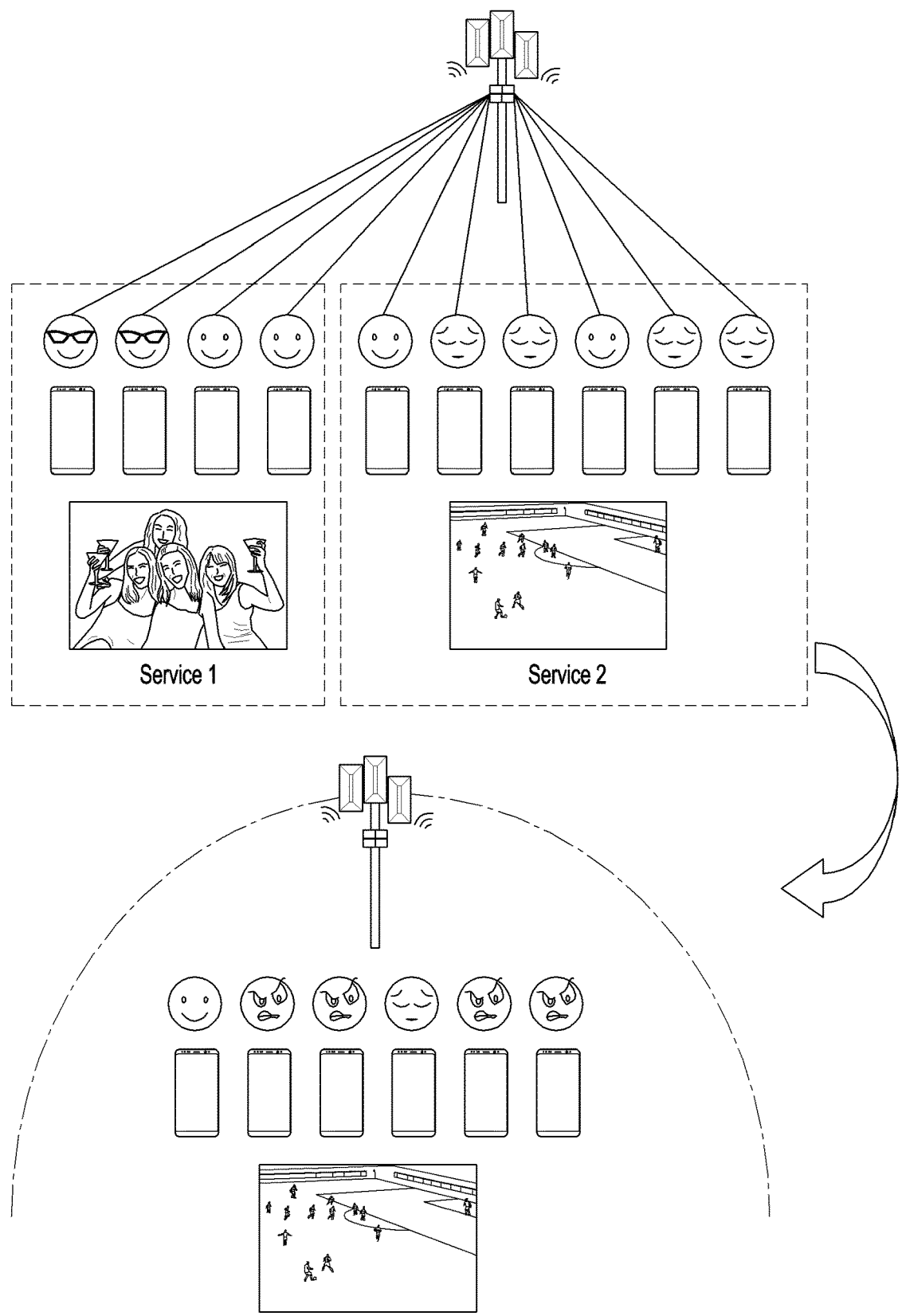

The present disclosure provides a method for MooD service. In the following detailed description of the embodiments of the present disclosure, reference is made to the accompanying drawings that form a part hereof, and in which are shown by way of illustration certain embodiments in which the present disclosure may be practiced. These embodiments are described in sufficient detail to enable those skilled in the art to practice the present disclosure, and it is to be understood that other embodiments may be utilized and that changes may be made without departing from the scope of the present disclosure. The following detailed description is, therefore, not intended to be taken in a limiting sense, and the scope of the present disclosure is defined only by the appended claims and their equivalents.

The present disclosure may refer to "an", "one" or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in the present disclosure, indicate the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms used herein have the same meanings as commonly understood by one of ordinary skill in the art to which this present disclosure pertains. It will be further understood that terms, such as those defined in commonly used dictionaries, should be interpreted as having meanings that are consistent with their meanings in the context of the relevant art and should not be interpreted in an idealized or overly formal sense unless expressly so defined herein.

The embodiments herein and the various features, advantages, and details thereof are described more fully with reference to the non-limiting embodiments that are illustrated in the accompanying drawings and detailed in the following description. Descriptions of well-known components and processing techniques are omitted so as to not unnecessarily obscure the present disclosure. The examples used herein are intended merely to facilitate an understanding of ways in which the present disclosure may be practiced and to further enable those skilled in the art to practice the present disclosure. Accordingly, the examples are not intended to be construed as limiting the scope of the present disclosure.

The present disclosure describes a method for MooD service. The MooD service allows service providers to host a particular service such as an evolved MBMS content in broadcast mode or unicast mode for efficient resource utilization. In the conventional art, switching a transmission from unicast to broadcast or vice versa is based on user demand and content usage. The user demand measurement is performed based on consumption reporting received from users at a CRS and processed at an e-scheduler. However, in the present disclosure, an MOS for the content transmitted by the service provider is obtained from each user to decide on switching the transmission from unicast to broadcast and vice versa. As a part of 3GPP Specification 26.346, the reception reporting is fed on QoE parameters experienced by a user to external servers at runtime. The following are the factors that account for a QoE experienced by users.

1. Initial Re-buffering Duration
2. Re-buffering Frequency
3. Mean Re-buffering time
4. Successive loss of real-time transport protocol (RTP) packets
5. Frame rate deviation
6. Jitter duration
7. Content Access/Switch time
8. Network Resource
9. Average codec bit-rate
10. Codec information Using the above factors, a linear regression based model is created to calculate the MOS of a content that reflects the QoE experienced by a user. The range of the MOS varies from 1 (Low)-5 (High) as shown in Table 1 below.

TABLE 1

| MOS | Quality | Impairment |
| --- | --- | --- |
| >4 | Excellent | Imperceptible |
| 3-4 | Good | Perceptible but not annoying |
| 2-3 | Fair | Slightly Annoying |
| 1-2 | Poor | Annoying |
| 0-1 | Bad | Very Annoying |

Figure 3:
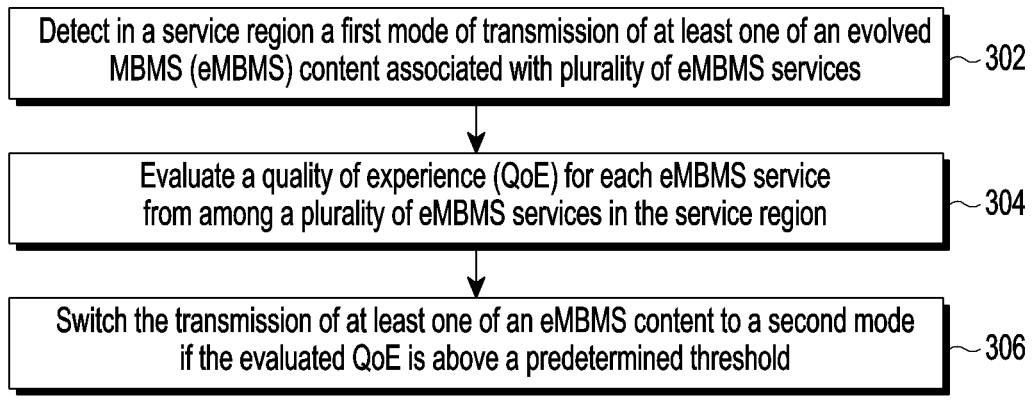
FIG. 3 is a flowchart of a method of an MooD based on user behavior modeling, according to an embodiment of the present disclosure.

FIG. 3 is a flowchart of a method of an MooD service, according to an embodiment of the present disclosure. The step by step procedure for providing an MooD service is described herein as follows. If there are two modes of transmission, namely a first mode and a second mode, where the first mode of transmission corresponds to a unicast mode and the second mode of transmission corresponds to a broadcast mode.

Referring to FIG. 3, at step 302, a first mode of transmission of an eMBMS content associated with a plurality of eMBMS services is detected in a service region. At step 304, a QoE is evaluated for each eMBMS service from among a plurality of eMBMS services in the service region. This is performed to determine which service is having high QoE among the plurality of services present in that region. In an embodiment, the plurality of services may be ranked or sorted in ascending order for deciding on switching the mode of transmission for those services.

At step 306, the mode of transmission is switched for the at least one of an eMBMS content to a second mode if the evaluated QoE is above a predetermined threshold. However, if the evaluated QoE is below a predetermined threshold, then the transmission of the at least one eMBMS service is retained in a first mode. According to an embodiment, the first mode and second mode of transmission correspond to a unicast mode and a broadcast mode, respectively.

Figure 4:
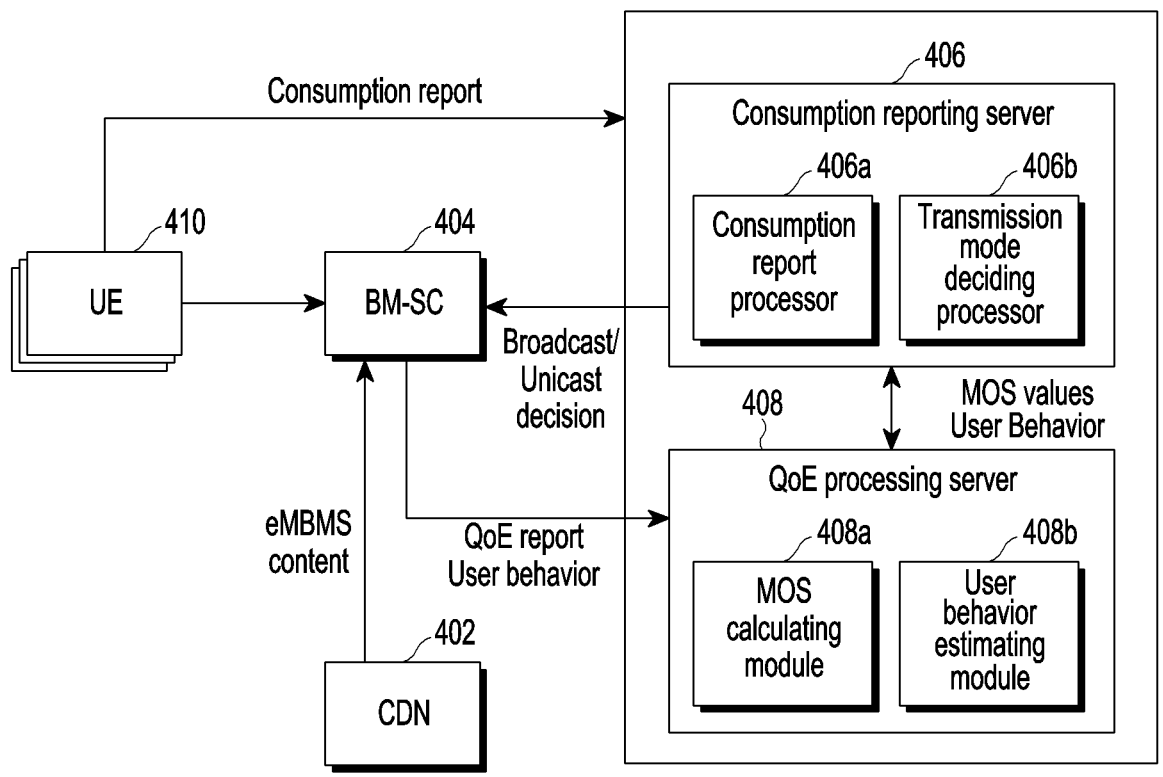
FIG. 4 is a block diagram of a system for deciding to switch mode of transmission of eMBMS content from unicast mode to broadcast mode, according to an embodiment of the present disclosure.

FIG. 4 is a block diagram of a system for deciding to switch mode of transmission of eMBMS content from unicast mode to broadcast mode, according to one embodiment.

Referring to FIG. 4, the system includes a content delivery network (CDN) 402, a BM-SC 404, a CRS 406, a QoE processing server 408 and a plurality of UEs 410. The CRS 406 further includes a consumption report processor 406a and a transmission mode deciding processor 406b. The QoE processing server 408 further includes an MOS calculating module 408a and a user behavior estimating module 408b. The functions of each block are described below in greater detail.

The CDN 402 is adapted for delivering eMBMS content to a plurality of UEs 410 via the BM-SC 404. The consumption/reception report associated with the eMBMS content is obtained from the plurality of UEs 410 and is sent to the CRS 406. The obtained consumption/reception report is processed by the consumption report processor 406a in the CRS 406. Further, the consumption report processor 406a analyzes a QoE experienced by users via the QoE processing server 408, where the QoE processing server 408 calculates MOS values for the eMBMS content watched by the plurality of UEs 410. While calculating a MOS, the QoE processing server 408 uses user behavior estimating module 408b to calculate user behavior on whether a user is likely to continue watching the eMBMS content in the future. The output of the CRS 406 and the QoE processing server 408 is provided to the BM-SC 404 to switch the mode of transmission of eMBMS content based on the MOS obtained for the eMBMS content. If the obtained MOS are high, then the BM-SC 404 switches the mode of transmission from unicast mode to broadcast mode.

Figure 5:
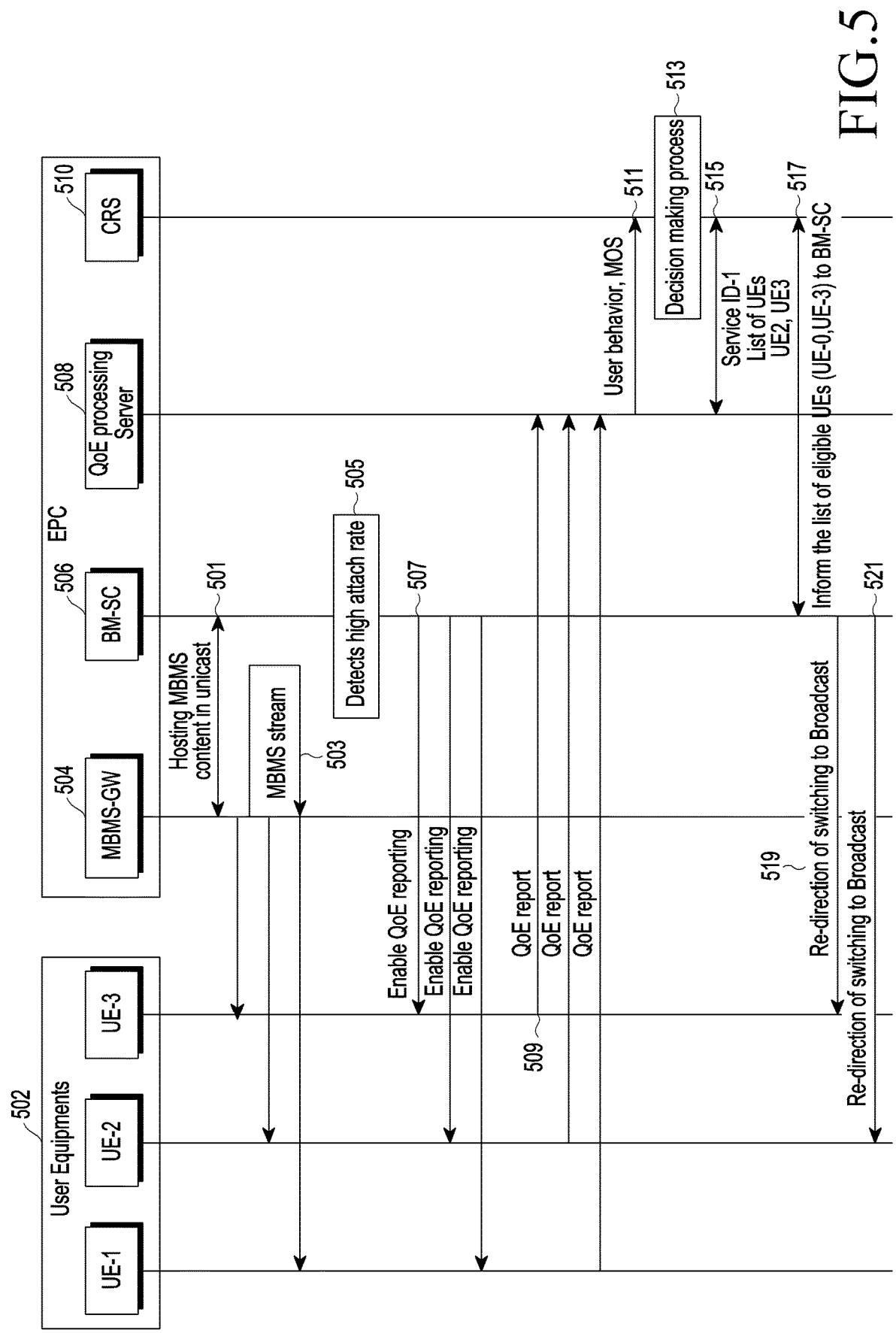
FIG. 5 is a flow diagram of switching a transmission mode of eMBMS content being transmitted to a plurality of user devices, according to an embodiment of the present disclosure.

FIG. 5 is a flow diagram of switching of a transmission mode of eMBMS content being transmitted to a plurality of user devices, according to an embodiment of the present disclosure.

Referring to FIG. 5, a plurality of UEs, namely UE-1, UE-2, and UE-3, 502 present in a certain region, is in communication with a BM-SC 506 via an MBMS-gateway (GW) 504. In an embodiment of the present disclosure, the BM-SC 506 hosts an eMBMS content in unicast mode for the delivery of eMBMS content to the plurality of UEs 502 via the MBMS-GW 504 at step 501 and step 503. At step 503, the BM-SC 506 detects a high attach rate for the eMBMS content delivered in unicast mode. Therefore, BM-SC 506 initiates QoE measurement to be performed by the plurality of UEs 502 for the eMBMS content delivered to the plurality of UEs 502 at step 507.

To perform the QoE measurement, the plurality of UEs 502 consider at least one of the factors including, but not limited to initial re-buffering duration, re-buffering frequency, mean re-buffering time, successive loss of RTP packets, frame rate deviation, jitter duration, content access/switch time, network resource, average codec bit-rate, and codec information and the QoE processing server 508 calculates(or evaluates) an MOS value which reflects the QoE experienced by the plurality of UEs 502. At step 509, the QoE report is then sent to a QoE processing server 508 for further processing. At step 511, the QoE processing server 508 also determines user behavior, and provides both the evaluated QoE (MOS) and user behavior to a CRS 510. The CRS 510 then decides whether the mode of transmission of eMBMS content is to be switched from unicast mode to broadcast mode at step 513. Based on the decision, at step 515, the CRS 510 informs a type of mode and list of UEs for which the mode of transmission is to be changed to the QoE processing server 508. The QoE processing server 508 then informs the list of eligible UEs to the BM-SC 506 at step 517. Then, at step 519 and step 521, the BM-SC 506 switches the mode of transmission of eMBMS content to the list of UEs (e.g., UE-2 and UE-3) as shown in FIG. 5. It is to be understood that the UE-1 continues to receive the eMBMS content in unicast mode.

In an embodiment of the present disclosure, the plurality of UEs 502 are segregated based on their currently experienced MOS. Thus, at least one UE of the plurality of UEs 502 having a relatively high MOS will be segregated into a first group of UE and at least one UE of the plurality of UEs 502 having a relatively low MOS will be segregated into a second group of UE. Therefore, the at least one UE of the plurality of UEs 502 whose MOS is relatively high will receive the eMBMS content in broadcast mode while the at least one UE of the plurality of UEs 502 having low MOS continues to receive the eMBMS content in unicast mode. An exemplary segregation of UEs based on MOS is shown in FIG. 6.

Figure 6:
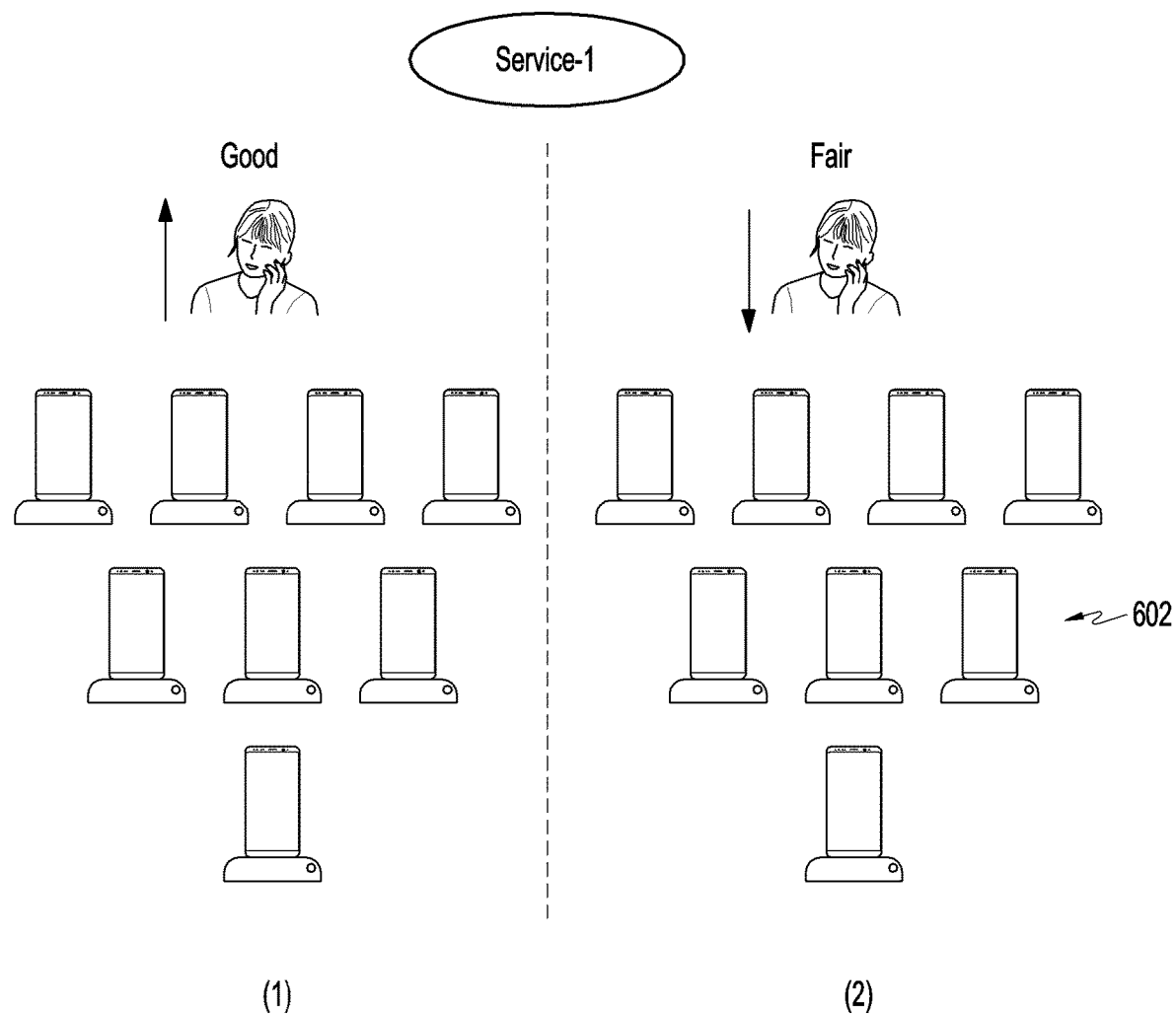
FIG. 6 is an illustration of a method of segregating UEs based on MOS for eMBMS content received from a single eMBMS service provided to a group of UEs present in a region, according to an embodiment of the present disclosure.

FIG. 6 is an illustration of a method of segregating UEs based on MOS for eMBMS content received from a single eMBMS service provided to a group of UEs present in a particular region, according to an embodiment of the present disclosure. In one operation, a certain region only has one eMBMS service (Service 1) available and transmits only eMBMS content to the group of UEs present in that region.

Referring to FIG. 6, the group of UEs 602 is served with an eMBMS content using a first mode (e.g., a unicast mode). As described above with reference to FIG. 5, MOS is calculated for each UE 602 to measure a QoE experienced by users of the UEs. Based on the MOS, the UEs which are having a high MOS and a low MOS are segregated into a first group of UEs (in panel (1)) and a second group of UEs (in panel (2)). Therefore, the mode of transmission is switched from unicast mode to broadcast mode for the first group of UEs which are having a high MOS for delivering the eMBMS content via "Service 1." However, the second group of UEs tend to receive the eMBMS content in unicast mode from "Service 1" as the second group of UEs are having a low MOS. The same, is shown in second panel (2) of FIG. 6.

Figure 7:
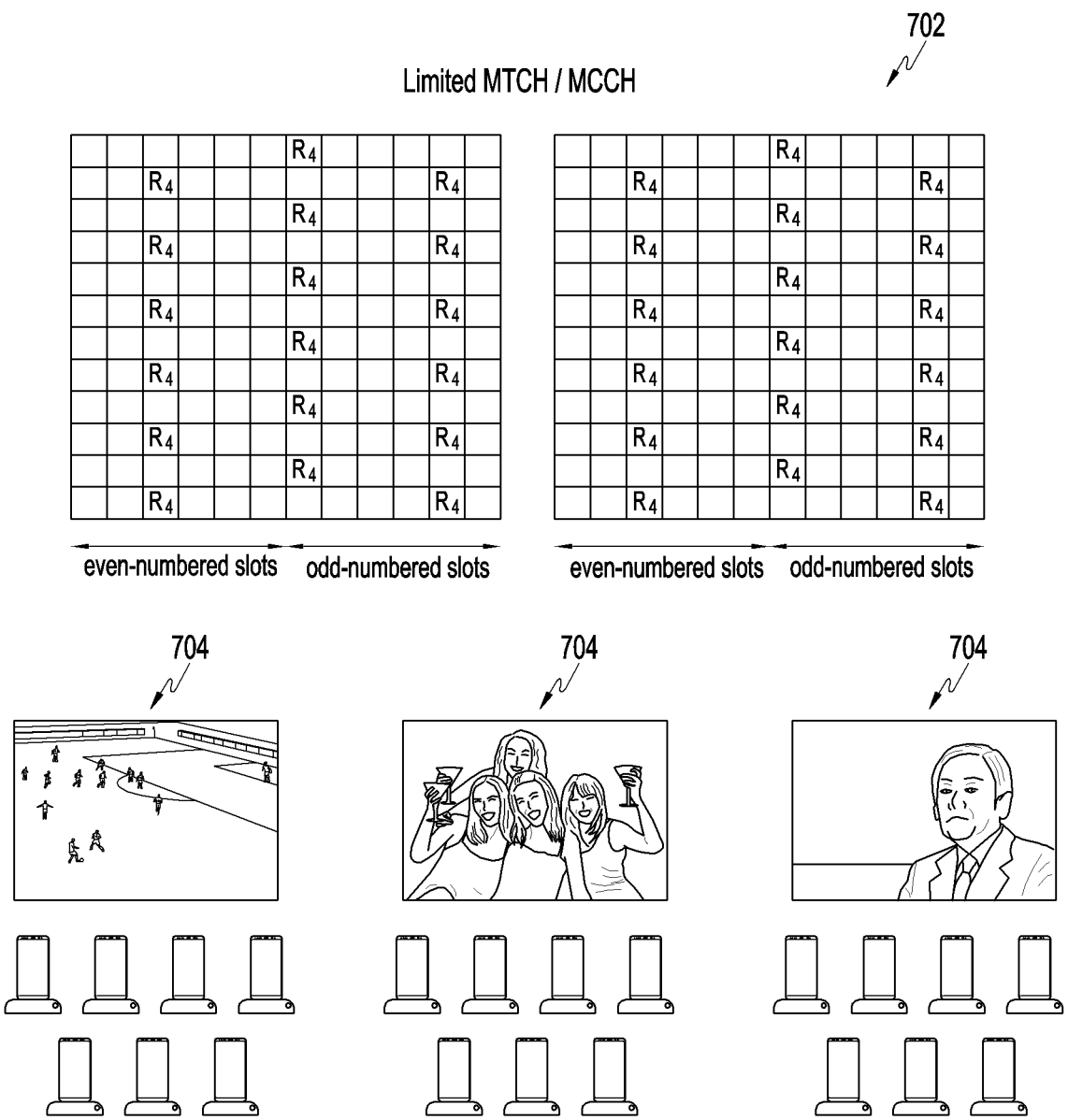
FIG. 7 is an illustration of a method of dynamically controlling physical broadcast resource allocation between different services, according to an embodiment of the present disclosure.

FIG. 7 is an illustration of a method of dynamically controlling physical broadcast resource allocation between different services, according to an embodiment of the present disclosure. The MOS experienced by users in a certain service is considered for dynamically controlling physical broadcast resource allocation between different services.

Referring to FIG. 7, based on MOS, UEs are segregated into different groups and, accordingly, hardware resources 702 are allocated by a service provider for each group of UEs to watch respective eMBMS content 704. Accordingly, the present disclosure provides dynamic allocation of physical resource blocks (PRBs) for MBMS channels (MBMS traffic channel (MTCH) and MBMS control channel (MCCH)) for each group of UEs based on the MOS of each group of UEs instead of having static allocation of the same PRBs for all MBMS channels.

In the above detailed description of the embodiments of the present disclosure, reference is made to the accompanying drawings that form a part thereof, and in which are shown by way of illustration certain embodiments in which the present disclosure may be practiced. These embodiments are described in sufficient detail to enable those skilled in the art to practice the present disclosure, and it is to be understood that other embodiments may be utilized and that changes may be made without departing from the scope of the present disclosure. The above detailed description of the present disclosure is, therefore, not intended to be taken in a limiting sense, and the scope of the present disclosure is defined only by the appended claims and their equivalents.

What is claimed is:

1. A method for providing, by a server, a multimedia broadcast multicast service (MBMS) in a wireless communication system, the method comprising:
obtaining information on a quality of experience (QoE) evaluated for each evolved MBMS (eMBMS) from among a plurality of eMBMSs in a service region, and estimation on user behavior indicating whether a user of the each eMBMS is likely to continue to watch corresponding eMBMS content, the QoE being evaluated based on parameters related to each of a plurality user equipments (UEs) receiving data of the each eMBMS, wherein the parameters include a re-buffering frequency;
determining, based on the information on the evaluated QoE and the estimation on the user behavior, at least one UE for which a transmission mode for at least one eMBMS content is to be changed, from among the plurality of UEs, wherein the determining includes identifying which eMBMS among the plurality of eMBMSs has a high QoE in the service region based on an ascending order ranking of the plurality of eMBMSs; and switching the transmission mode for the at least one UE based on transmitting, to a broadcast multicast service center (BM-SC), a list identifying each of the at least one UE for which the transmission mode is to be changed.

2. The method of claim 1, wherein the transmission mode comprises at least one of a unicast mode or a broadcast mode.

3. The method of claim 2, wherein the plurality of eMBMSs are provided to the plurality of UEs in the at least one of the unicast mode or the broadcast mode, respectively.

4. The method of claim 2, wherein switching the transmission mode for the at least one UE comprises switching the unicast mode to the broadcast mode for the at least one UE having the evaluated QoE greater than a predetermined threshold, if the transmission mode is the unicast mode.

5. The method of claim 2, wherein switching the transmission mode for the at least one UE comprises retaining the unicast mode for the at least one UE having the evaluated QoE less than a predetermined threshold, if the transmission mode is the unicast mode.

6. The method of claim 2, wherein switching the transmission mode for the at least one UE comprises retaining the broadcast mode for the at least one UE having the evaluated QoE greater than a predetermined threshold, if the transmission mode is the broadcast mode.

7. The method of claim 2, wherein switching the transmission mode for the at least one UE comprises switching the broadcast mode to the unicast mode for the at least one UE having the evaluated QoE less than a predetermined threshold, if the transmission mode is the broadcast mode.

8. The method of claim 1, wherein the information on the evaluated QoE comprises a mean opinion score (MOS) calculated for the eMBMS content currently provided to the each UE, and the MOS is calculated based on the parameters.

9. The method of claim 2, further comprising:

segregating, based on the determination result, the plurality of UEs into a first group of at least one UE to which the eMBMS content is to be provided in the unicast mode and a second group of at least one UE to which the eMBMS content is to be provided in the broadcast mode.

10. The method of claim 9, further comprising:

providing information on the first and second groups to a network entity responsible for transmission of the eMBMS content.

11. The method of claim 1, wherein physical broadcast resource allocation between different services is dynamically controlled based on the information on the evaluated QoE.

12. An apparatus of a server for providing a multimedia broadcast multicast service (MBMS) in a wireless communication system, the apparatus comprising:

a communication interface configured to communicate with other network entity; and at least one processor coupled with the communication interface and configured to:

obtain information on a quality of experience (QoE) evaluated for each evolved MBMS (eMBMS) from among a plurality of eMBMSs in a service region, and estimation on user behavior indicating whether a user of the each eMBMS is likely to continue to watch corresponding eMBMS content, the QoE being evaluated based on parameters related to each of a plurality of user equipments (UEs) receiving data of the each eMBMS, wherein the parameters include a re-buffering frequency, determine, based on the information on the evaluated QoE and estimation on user behavior, at least one UE for which a transmission mode for at least one eMBMS content is to be changed, from among the plurality of UEs, wherein the determining includes identifying which eMBMS among the plurality of eMBMSs has a high QoE in the service region based on an ascending order ranking of the plurality of eMBMSs, and switch the transmission mode for the at least one UE based on transmitting, to a broadcast multicast service center (BM-SC), a list identifying each of the at least one UE for which the transmission mode is to be changed.

13. The apparatus of claim 12, wherein the transmission mode comprises at least one of a unicast mode or a broadcast mode.

14. The apparatus of claim 13, wherein the at least one processor is configured to switch the unicast mode to the broadcast mode, for at least one UE having the evaluated QoE greater than a predetermined threshold, if the transmission mode is the unicast mode, and wherein the at least one processor is configured to retain the unicast mode, for at least one UE having the evaluated QoE less than the predetermined threshold, if the transmission mode is the unicast mode.

15. The apparatus of claim 13, wherein the at least one processor is configured to retain the broadcast mode, for at least one UE having the evaluated QoE greater than a predetermined threshold, if the transmission mode is the broadcast mode, and wherein the at least one processor is configured to switch the broadcast mode to the unicast mode, for at least one UE having the evaluated QoE less than the predetermined threshold, if the transmission mode is the broadcast mode.

16. The apparatus of claim 13, wherein the information on the evaluated QoE comprises a mean opinion score (MOS) calculated for the eMBMS content currently provided to the each UE, and the MOS is calculated based on the parameters.

17. The apparatus of claim 13, wherein the at least one processor is further configured to segregate, based on the determination result, the plurality of UEs into a first group of at least one UE to which the eMBMS content is to be provided in the unicast mode and a second group of at least one UE to which the eMBMS content is to be provided in the broadcast mode.

18. The apparatus of claim 17, wherein the at least one processor is further configured to provide information on the first and second groups to a network entity responsible for transmission of the eMBMS content.

* * * * *